Patented July 3, 1945

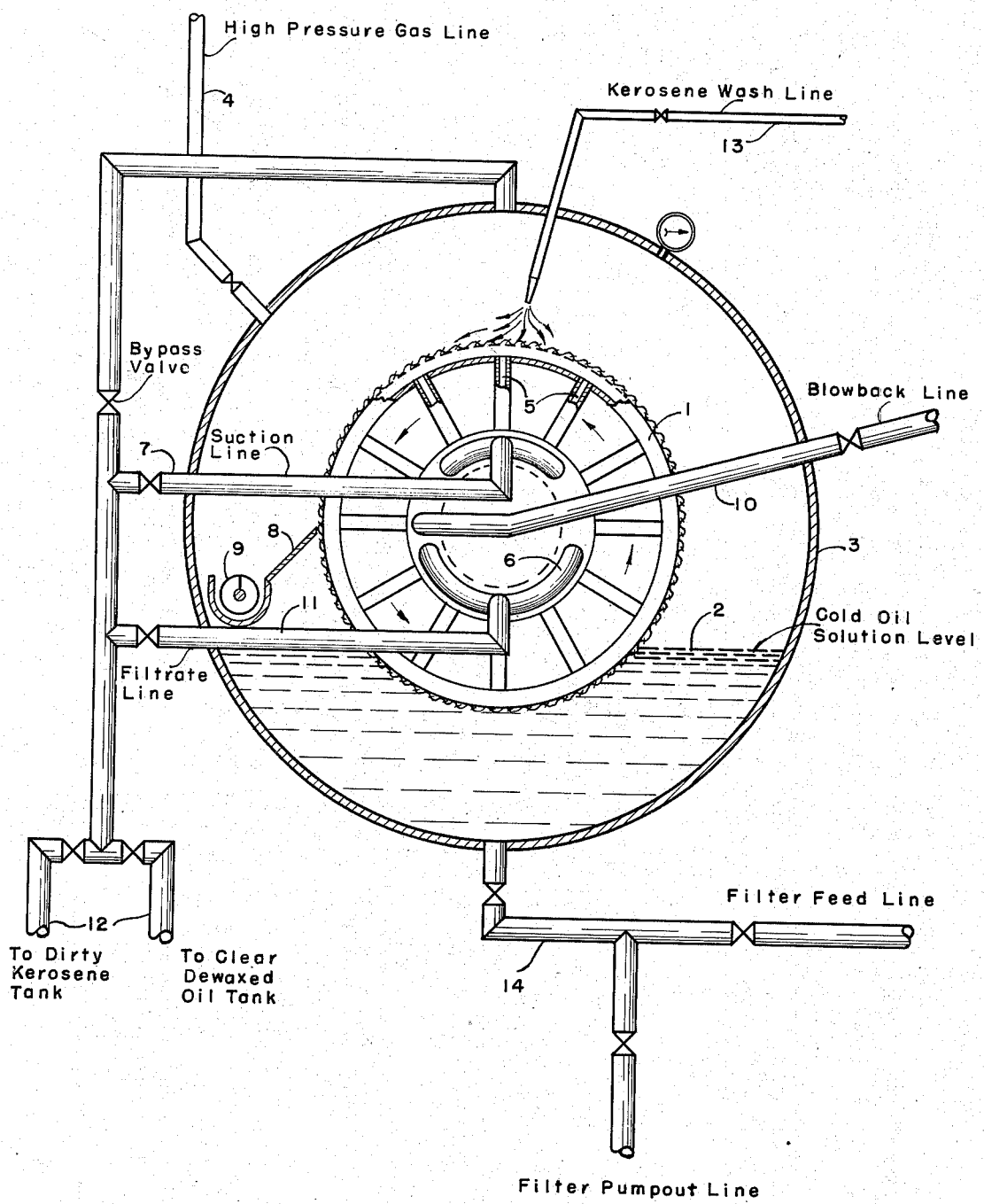

2,379,754

UNITED STATES PATENT OFFICE 2,379,754

METHOD OF WASHING ROTATING DRUM FILTERS

John A. Selensky, Goose Creek, Tex., assignor to Standard Oil Development Company, a corporation of Delaware Application August 1, 1940, Serial No. 349,243

3 Claims. (Cl. 210—201)

The present invention relates to a method of operating rotary filter apparatus, and more particularly to a method of washing the filter cloth in a rotary filter without substantially interrupting the filtering operation.

It is the object of the present invention to provide a method for cleaning a filter cloth on the drum of a rotary filter without pumping out the filter shell, avoiding contamination of the chilled feed material allowed to remain in the shell, and reducing the out-of-service time period.

One of the process problems in the manufacture of lubricating oils and the like, is that which requires an excess of filter capacity to provide for the maintenance of operations during the frequent shut-down required for cleaning or washing the filter cloth of a rotary filter used for the dewaxing of lubricating stocks. It has been customary to wash the filter cloth with warm kerosene, at least once every day. Although the operation is not a very lengthy one, the time consumed is sufficient to seriously interfere with the operation of other process equipment. In order to avoid the delay and interference with smooth operation, it has been necessary, in many instances, to provide at least one additional filter in a group of six, to provide the filtering capacity required by other units in the plant.

According to the former procedure, when a filter cloth is to be washed, the shell is drained of its liquid contents, normally maintained at —40° F. or —50° F., and a hot solvent such as kerosene introduced with a low differential pressure across the filter surface to draw the solvent through the cloth, melting waxy constituents and removing them from the cloth. When the washing is complete, the filter temperature has to be reduced again and the shell refilled to the proper level before the filter can be restored to service. The necessity for draining, increasing temperature of the shell, refilling, and again reducing the temperature, after heating the entire body of the filter during the washing step, not only consumes time but places an additional burden on the operating equipment such as pumps and compressors.

According to the method now proposed, the washing time can be reduced from a minimum of two hours to about one-half hour, and it is not necessary to either drain the filter shell or to greatly increase the operating temperature of the filter during the washing step. As a result, the interruption of the plant operation is so reduced that no extra filter equipment is required, and the compressors and pumps may be operated normally without overload.

As applied to the conventional form of rotary filter apparatus, the present method requires the introduction of a solvent through a line into the filter shell at a high point therein. This solvent line communicates with a spray discharge header extended longitudinally of the shell above the filter drum. A valve in the solvent line should be provided to control the flow of solvent to the header. The remaining connections to the filter shell, including the feed line for material to be filtered, the filtrate draw-off lines, and gas pressuring lines, are substantially unchanged.

The present invention will be more clearly understood from the following detailed description of the accompanying drawing in which the single figure is a side elevation, partly in section, of a drum filter modified for the practice of the present invention.

The operating procedure contemplated, may be adequately illustrated by reference to a filter in service as a dewaxing unit, in which the filter drum 1 is rotated through a body 2 of a chilled solution of a wax-containing lubricating oil maintained at a substantially constant intermediate level in the filter shell 3. Filtration of such a material is obtained by maintaining a superatmospheric pressure in the shell of the filter, by means of the gas pressuring line 4, while placing suction on the interior lines 5 of the filter drum which open into the plurality of filtrate collection zones 6, located below the filter surface. During the rotation of the drum, filtrate is drawn from these zones while they are submerged in the feed material, and by maintaining suction through a separate line 7, the wax cake formed on the filter surface is dried as the drum continues its rotation into the gas filled upper portion of the shell. As the drum continues to rotate, it brings the dried wax cake into contact with a knife-like scraper 8 which removes the cake from the drum into a trough 9 from which it is conveyed to outside the shell. It is customary to introduce a pressure gas by way of line 10 through the filtrate collection lines in the drum just prior to the approach of each section served thereby, to the scraper element, in order to loosen the cake from the filter cloth.

When, as happens at least once every day, the filter cloth becomes impregnated with wax from the filtering operation, it is intended that the normal operation of the filter be interrupted for cleaning of the cloth, but without either pumping out the waxy oil solution, or reducing the shell temperature to any substantial extent. Instead, the filter feed line 14 is merely closed, and a modified form of operation continued.

The line 11 leading to the filtrate withdrawal ports, communicating with the drum collection lines 12, is closed, preventing further filtering of oil from the feed liquid in the shell. Rotation of the drum is then continued until all of the previously deposited wax cake is removed by the scraper. At such time, the scraper blade is retracted from the filter surface, and the blow-back line 10 to the drum is closed. The valve in the pressuring gas line is adjusted to maintain a pressure differential of about 10 pounds per square inch across the filter surface while taking suction on the dry port line 7, as usual, or by merely venting the line to a collection tank at atmospheric pressure. Obviously, the normal connection of the filtrate and dry port lines to a receiver for the filtrate is closed during this operation.

With the apparatus in the condition set forth, the valve in the solvent line 13 is opened so as to discharge a solvent material such as kerosene, onto the upper surface of the filter drum. The valve should be regulatable to provide for a flow of solvent which may be fully absorbed, by wax impregnated cloth, and withdrawn therethrough within the sector of the drum which is served by the dry port lines, the cake drying sector of normal operation.

While admitting solvent slowly in this fashion, and taking care that the flow is fully withdrawn within the drying sector without spilling into the body of filtering solution, the drum is rotated at very low speed. Usually, if the differential pressure through the filter surface is maintained at about 10 pounds per square inch and the solvent is maintained at about 150° F., the cleaning operation is satisfactorily performed at the end of one revolution when the drum is rotated at a speed of about 15 revolutions per hour. By increasing the temperature of the solvent to about 200° F. and increasing the differential pressure, the rotation speed of the drum can be increased to about 20 revolutions per hour. Similarly by decreasing the rotation speed of the drum, lower solvent temperatures and slightly lower pressure differentials across the filter may be employed, but it has been found that optimum results are usually obtained by the procedure described.

When the cleaning step has been completed, the solvent inlet line is again closed, and the other connections to the shell and drum restored to the normal operating condition in readiness for returning the filter to the filtering operation. It will be found that the temperature of the shell has not been noticeably increased, and that the normal operating efficiency of the filter is attained almost immediately without imposing any undue loads on the compressors or refrigeration equipment.

Although, for the purpose of illustration, the invention has been described simply and in relation to a specific type of operation, it is not intended that any limitations shall be thereby implied. It is intended that the true scope of the inventive concept involved in this disclosure shall be determined only by the appended claims.

I claim:

1. In the operation of a rotary wax filter, including a filter shell, and a rotatable drum therein having an annular filter surface wherein wax bearing solution is drawn through filter surface by pressure differential while immersed in the lower portion of the filter shell containing said wax bearing solution, and wax cake formed on filter surface is dried in upper portion of shell as said drum continues its rotation in filter shell above level of wax bearing liquid, the method which comprises at spaced intervals substantially equalizing pressure across the filter surface in lower portion filtration zone within the shell, maintaining a differential pressure across said filter surface in upper filtering zone within the shell, directing a controlled stream of solvent liquid for wax against the filter surface within the limits of said upper filtering zone, rotating the filter drum at low speed to bring successive areas of the filter surface into contact with the solvent liquid, and continuously withdrawing said solvent liquid through the filter surface and the drum by the action of said differential pressure.

2. In the refining of waxes and mineral lubricating oils containing wax in suspension at relatively low temperatures, the step of cleaning filter surfaces of rotatable drum filters which comprises interrupting the flow of wax bearing feed to the filter drum, rotating the drum until all of previously deposited wax is removed from filter surface of rotating drum, then directing a stream of solvent liquid for wax against a limited area of the filter surface uppermost of the drum, maintaining a differential pressure across the filter surface inward through the drum within said limited area whereby the entire feed of solvent liquid is passed through the filter surface, slowly rotating the filter drum to bring successive portions of the filter surface into the limited cleaning area, withdrawing the solvent liquid containing wax through the filter surface of the drum; then, after all the filter surface has been treated and the solvent liquid removed from within the drum, continuing the normal flow of the wax bearing feed under normal filter operating conditions and repeating the cycle as required.

3. The step in the refining of waxes and mineral lubricating oils containing wax in suspension at relatively low temperatures according to claim 2 in which the differential pressure across a limited area of said filter surface is maintained at substantially 10 lbs./sq. in while rotating the drum at the rate of one revolution per hour.

JOHN A. SELENSKY.